(12) United States Patent
Cacciotti

(10) Patent No.: US 8,758,487 B2
(45) Date of Patent: Jun. 24, 2014

(54) MACHINE TOOL MOUNTED MIST COLLECTOR

(76) Inventor: Paul Cacciotti, Troy, NY (US)

( * ) Notice: Subject to any disclaimer, the term of this patent is extended or adjusted under 35 U.S.C. 154(b) by 180 days.

(21) Appl. No.: 13/283,467

(22) Filed: Oct. 27, 2011

(65) Prior Publication Data

US 2012/0103195 A1    May 3, 2012

Related U.S. Application Data

(60) Provisional application No. 61/407,445, filed on Oct. 28, 2010.

(51) Int. Cl.
*B01D 50/00* (2006.01)
*B01D 46/24* (2006.01)

(52) U.S. Cl.
CPC .................. *B01D 46/2411* (2013.01)
USPC ............... 95/287; 55/318; 55/323; 55/385.1; 55/385.3; 96/417; 96/421

(58) Field of Classification Search
USPC .............. 95/287; 55/323, 385.1, 318; 96/417, 96/421
See application file for complete search history.

(56) References Cited

U.S. PATENT DOCUMENTS

| | | | | |
|---|---|---|---|---|
| 4,189,310 A | * | 2/1980 | Hotta | 55/317 |
| 7,115,150 B2 | * | 10/2006 | Johnson et al. | 55/486 |
| 2006/0037918 A1 | * | 2/2006 | Spani | 210/774 |

* cited by examiner

*Primary Examiner* — Robert Clemente
*Assistant Examiner* — Karla Hawkins
(74) *Attorney, Agent, or Firm* — Superior IP, PLLC; Dustin L. Call

(57) ABSTRACT

One example embodiment includes a system for removing cooling liquid from a mist. The system includes an intake, where the intake is configured to receive the cooling mist. The system also includes a mist filter, where the mist filter is configured to remove cooling liquid from the mist. The system further includes an exhaust, where the exhaust is configured to output the demisted air.

19 Claims, 4 Drawing Sheets

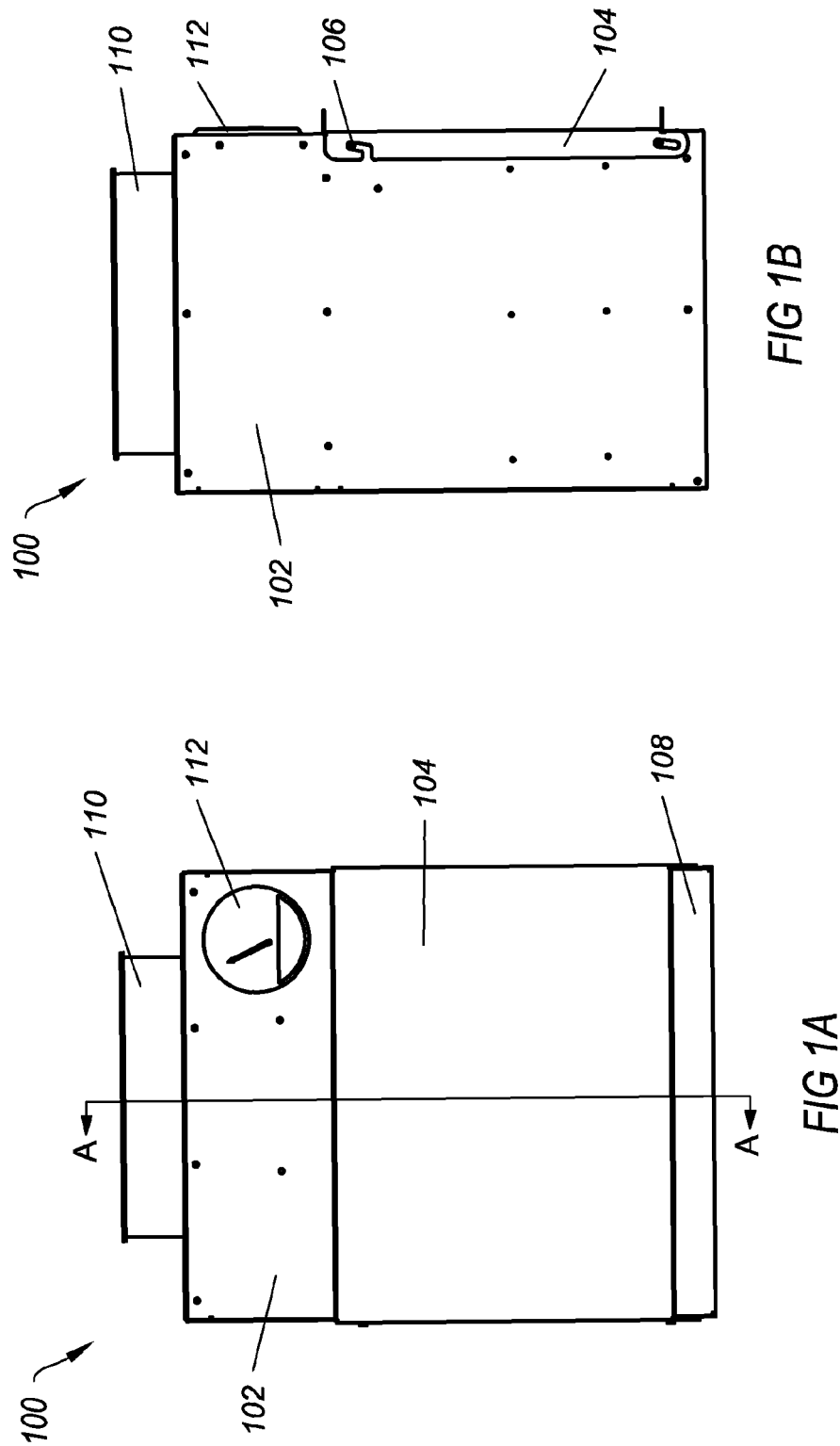

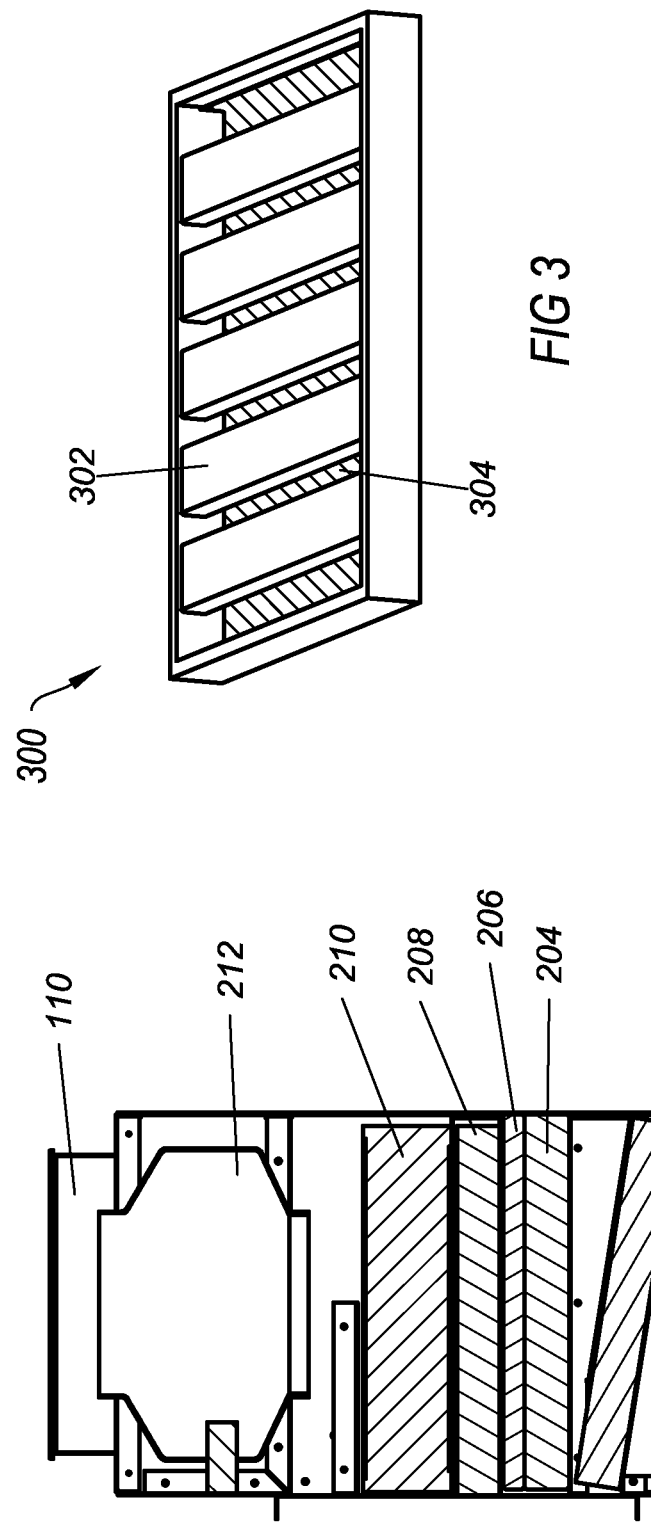

MACHINE TOOL MOUNTED MIST COLLECTOR

CROSS-REFERENCE TO RELATED APPLICATIONS

This application claims the benefit of and priority to U.S. Provisional Patent Application Ser. No. 61/407,445 filed on Oct. 28, 2010, which application is incorporated herein by reference in its entirety.

BACKGROUND OF THE INVENTION

Cooling liquid is commonly used with machine tools. These tools may produce a high rate of motion or rotation. As the tool interacts with a work material, the high rate of motion may lead to high amounts of frictional heating. This heating may damage the tool, the work material or both. To prevent his damage a cooling liquid is often circulated over the tool and work material. The circulating cooling liquid removes the heat, preventing unwanted damage.

Nevertheless, there are a number of drawbacks associated with the use of cooling liquid. In particular, the motion of the tool tends to scatter the cooling liquid. I.e., the stream of cooling liquid is disrupted and broken up into droplets. This can result in cooling liquid causing a large mess in the immediate area.

In addition, it can make it more difficult to recover the cooling liquid. I.e., the cooling liquid is recirculated over and over, repeatedly dissipating the frictional heat. However, the disruption of the cooling liquid stream can result in loss of cooling liquid. This can lead to a loss of efficiency as the cooling liquid may not be given sufficient time to be cooled before being recirculated. Further, it can lead to greater expense as the cooling liquid needs to be replaced.

Moreover, the scattered droplets may be suspended in the air. These droplets can form a mist if enough droplets are formed. This cooling mist can enter air intakes of the machine tool or other machines in the nearby area, which can foul the operation of the machines. In addition, it can be inhaled by workers in the immediate area, causing respiratory or other health problems.

Accordingly, there is a need in the art for a system that can remove the cooling liquid droplets from the mist. In addition, there is a need in the art for the system to collect the cooling liquid. Further, there is a need in the art for the system to allow the cooling liquid to be recirculated.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for removing cooling liquid from a mist. The system includes an intake, where the intake is configured to receive the cooling mist. The system also includes a mist filter, where the mist filter is configured to remove cooling liquid from the mist. The system further includes an exhaust, where the exhaust is configured to output the demisted air.

Another example embodiment includes a system for removing cooling liquid from a mist. The system includes a housing and a fan, where the fan is configured to move air through the system. The system also includes an intake, where the intake is configured to allow a cooling mist from the exterior of the housing to enter the interior of the housing, where the cooling mist includes cooling liquid droplets suspended in air. The system further includes a mist filter. The mist filter is configured to remove the cooling liquid from the mist. The mist filter includes a first mist filter, where the first mist filter is configured to remove a portion of the cooling liquid from the cooling mist, and a second mist filter, where the second mist filter is configured to remove the majority of the remaining cooling liquid from the cooling mist. The system additionally includes an air filter. The air filter includes a first air filter, where the first air filter is configured to remove a portion of pollutants from the demisted air. The air filter also includes a second air filter, where the second air filter is configured to remove a portion of the pollutants not removed by the first air filter. The system also includes an exhaust, where the exhaust is configured to output the demisted air.

Another example embodiment includes a method for removing cooling liquid from a cooling mist. The method includes receiving a cooling mist, where the cooling mist includes cooling liquid droplets suspended in air. The method also includes passing the cooling mist through a mist filter, where the mist filter removes a portion of the cooling liquid droplets from the air. The method further includes passing the demisted air through an air filter, where the air filter removes a portion of a desired pollutant from the demisted air. The method additionally includes outputting the demisted and filtered air.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1A illustrates a front view of a mist collector;

FIG. 1B illustrates a side view of the mist collector;

FIG. 2 illustrates a cross-sectional view of the mist collector through the line A-A of FIG. 1A;

FIG. 3 illustrates an example of a baffle filter;

DETAILED DESCRIPTION OF SOME EXAMPLE EMBODIMENTS

Figure 5:
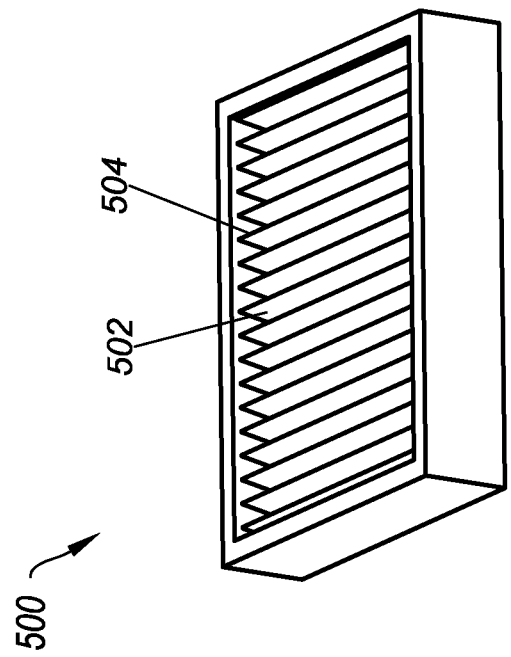
FIG. 5 illustrates an example of an air filter.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIGS. 1A and 1B illustrate an example of a mist collector 100. FIG. 1A illustrates a front view of the mist collector 100; and FIG. 1B illustrates a side view of the mist collector 100. In at least one implementation, the mist collector 100 can collect cooling liquid from a cooling mist. In particular, many tools use a cooling liquid that is applied to either the work surface or some portion of the tool. The cooling liquid is configured to remove the heat caused by friction during the machining process. The machining process can, in turn, throw droplets of the cooling liquid into the air, creating a mist. For example, the cooling liquid can include water, antifreeze, oils, water soluble oil or any other desired cooling liquid.

FIGS. 1A and 1B show that the mist collector 100 can include a housing 102. In at least one implementation, the housing 102 can surround and protect the other elements of the exercise system 100. In particular, the housing 102 can be configured to ensure that the other elements of the exercise system 100 are in the proper position relative to one another.

FIGS. 1A and 1B also show that the mist collector 100 can include a door 104. In at least one implementation, the door 104 can allow access to a portion of the interior of the housing 102. I.e., the door 104 can include a portion of the housing 102 which is movable or removable and allows a user to access the interior of the housing 102.

FIGS. 1A and 1B further show that mist collector 100 can include an attachment 106. In at least one implementation, the attachment 106 is configured to attach the door 104 to the housing 102. In particular, the attachment 106 can seal the connection between the door 104 and the housing 102, preventing unwanted air flow through the door 104 during operation. For example the attachment 106 can include one or more fasteners, such as screws, magnets, angled slots and pins or any other desired fastener. Additionally or alternatively, the attachment 106 can include one or more hinges which allow the door 104 to mover relative to the housing 102.

FIGS. 1A and 1B additionally show that the mist collector 100 can include an intake 108. In at least one implementation, the intake 108 can allow cooling mist to enter the housing 102. I.e., the intake 108 can pull cooling mist into the housing, where the cooling liquid will be removed from the cooling mist, as discussed below. Additionally or alternatively, the collected cooling liquid can pass back through the intake 108 to be used by the tool again.

FIGS. 1A and 1B also show that the mist collector 100 can include an exhaust 110. In at least one implementation, the exhaust 110 can allow clean air to exit the mist collector 100. I.e., the mist collector 100 will take in cooling mist through the intake 108, and pump out clean air, with the cooling liquid removed, through the exhaust 110. The exhaust 110 can connect to the machine tool, can be vented to the outdoors, or can be vented into the tool room, as desired by the user.

FIGS. 1A and 1B further show that the mist collector 100 can include a gauge 112. In at least one implementation, the gauge 112 can indicate the current state of one or more components within the mist collector 100. I.e., the gauge 112 can indicate to a user whether one or more components of the mist collector 112 are operating correctly and/or need to be replaced. For example, the gauge 112 can include a magnehelic gauge. A magnehelic gauge is a device used to measure positive, negative and differential pressures. A magnehelic gauge includes two air ports separated by a diaphragm. Pressure acting on the diaphragm of the gauge moves the indicating pointer. The movement of the pointer is relayed and amplified through a magnetic linkage. As the filter portions of the mist collector 100 become clogged, the pressure differential can increase. When the gauge measures a high enough pressure differential, one or more of the filters may need to be replaced.

FIG. 2 illustrates a cross-sectional view of the mist collector 100 through the line A-A of FIG. 1A. In at least one implementation, the mist collector 100 is configured to receive air that contains cooling mist. The mist collector 100 can remove the cooling liquid from the cooling mist, which can be returned to the machine tool, and any other pollutants in the air. The mist collector 100 can then exhaust clean air.

FIG. 2 shows that the mist collector 100 can include a first mist filter 202. In at least one implementation, the first mist filter 202 can include any desired material. For example, the first mist filter 202 can include plastic or metal. The first mist filter 202 can collect larger mist particles. I.e., the first mist filter 202 can collect large droplets from the cooling mist. For example, the first mist filter 202 can include a baffle filter. A baffle filter can include a series of baffles that the cooling mist must pass through. Because there is not a straight line through the filter, larger particles are unable to make the turns required by the air flow and collects on the baffles.

In at least one implementation, the first mist filter 202 can be inclined relative to a horizontal position. Inclining the first mist filter 202 can allow the larger droplets which have been collected to travel down the filter, where they are collected and reused as cooling liquid for the machine tool.

FIG. 2 also shows that the mist collector 100 can include a second mist filter 204. In at least one implementation, the second mist filter 204 can include any desired material. For example, the second mist filter 204 can include plastic or metal. The second mist filter can collect smaller mist particles. I.e., particles which are small enough to remain in the air flow and pass through the first mist filter 202 are collected by the second mist filter 204. The second mist filter 204 can be inclined similar to the first mist filter 202, allowing the collected cooling liquid to drain. Additionally or alternatively, the second mist filter 204 can be horizontal. Any droplets collected can form drops where collected which are allowed to drip onto the first mist filter 202 then collected and returned to the machine tool.

The second mist filter 204 can include any filter configured to receive smaller mist droplets. For example, the second mist filter 204 can include a mesh filter. In at least one implementation, a mesh filter can include one or more mesh layers. Mesh consists of semi-permeable barrier made of connected strands of material. I.e., mesh includes material with very small openings. As the cooling mist passes through the mesh filter, the cooling mist collects on the strands of material. Mesh layers can be offset relative to one another, eliminating straight lines of air flow. The more mesh layers present, the more droplets collected and the less droplets allowed to pass through the mesh filter; however, more mesh layers decrease the air flow through the mesh filter increasing the required pressure to circulate the cooling mist.

FIG. 2 further shows that the mist collector 100 can include a pre-filter 206. In at least one implementation, the pre-filter 206 can absorb any remaining cooling fluid within the air. I.e., the pre-filter 206 can be configured to ensure that any non-recoverable cooling fluid is also removed from the air. For example, the pre-filter 206 can include cloth or other material which will absorb the cooling fluid. For example, the pre-filter 206 can include a pad made of cotton, polyester or any other desired material.

FIG. 2 further shows that the mist collector 100 can include a first air filter 208. In at least one implementation, the first air filter 208 can be configured to remove one or more pollutants from the air. For example, the first air filter 208 can include a carbon filter. Carbon filtering is a method of filtering that uses a piece of activated carbon to remove contaminants and impurities, utilizing chemical adsorption. Activated carbon, also called activated charcoal, activated coal or carbo activatus, is a form of carbon that has been processed to make it extremely porous and thus to have a very large surface area available for adsorption. One pound (454 g) of activated carbon contains a surface area of approximately 100 acres. A carbon filter can be utilized to remove odors from the demisted air.

FIG. 2 additionally shows that the mist collector 100 can include a second air filter 210. In at least one implementation, second air filter 210 can remove additional air pollutants. For example, the second air filter 210 can include a particulate air filter. A particulate air filter is a device composed of fibrous materials which removes solid particulates such as dust, pollen, mold, and bacteria from the air. A particulate air filter can include foam, pleated paper, cotton, cloth or spun fiberglass filter elements. Additionally or alternatively, the second air filter 210 can include an ionizing filter. An ionizing filter, or ioniser, uses fibers or elements with a static electric charge, which attract dust particles.

One of skill in the art will appreciate that the first air filter and the second air filter can be combined with one another. For example, an ionizing filter may be able to remove both odor particles and larger particles from the air. Additionally or alternatively, the number of filters may be increased as needed to remove other pollutants or particles from the air.

FIG. 2 also shows that the mist collector 100 can include a fan 212. In at least one implementation, a fan is a machine used to create flow within the air. I.e., the fan 212 creates an air flow that draws cooling mist into the mist collector 100 through the first mist filter 202, the second mist filter 204, the first air filter 208, the second air filter 210 and out the exhaust 110.

FIG. 3 illustrates an example of a baffle filter 300. In at least one implementation, the baffle filter 300 can be used to collect large cooling mist droplets. For example, the baffle filter 200 can prevent straight line movement of the cooling mist. As the cooling mist comes in contact with the baffle filter 300 the cooling liquid condenses and is removed from the air.

FIG. 3 shows that the baffle filter 300 can include a first layer of baffles 302. In at least one implementation, the first layer of baffles 302 are flow-directing or obstructing vanes or panels used to direct air flow through the baffle filter 300. I.e., the first layer of baffles can include panels which cover a portion of the opening in which the baffle filter is placed.

FIG. 3 also shows that the baffle filter 300 can include a second layer of baffles 304. In at least one implementation, the second layer of baffles 304 can be offset relative to the first layer of baffles 302. Offsetting the second layer of baffles 304 relative to the second layer of baffles 302 can ensure that much of the air flow passes near either the first layer of baffles 302 or the second layer of baffles 304. The closer the air flow passes to either the first layer of baffles 302 or the second layer of baffles 304 the more the cooling liquid will condense out of the air.

Figure 4:
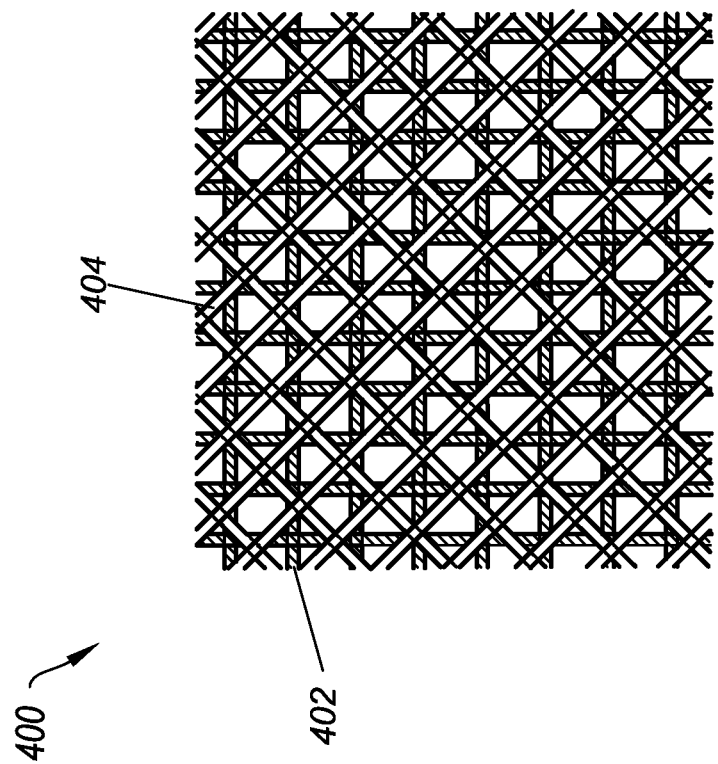
FIG. 4 illustrates an expanded view of an example of a mesh filter.

FIG. 4 illustrates an expanded view of an example of a mesh filter 400. In at least one implementation, the mesh filter 400 can be used to collect smaller cooling liquid droplets. For example, the mesh filter 400 can include small openings through which the cooling mist will flow. As the cooling mist comes in contact with the mesh filter 400 the remaining cooling liquid is removed from the air.

FIG. 4 shows that the mesh filter 400 can include a first layer of mesh 402. In at least one implementation, the first layer of mesh 402 can include small openings through which the cooling mist can pass. I.e., the first layer of mesh 402 includes much smaller openings that the openings of a baffle filter, as disclosed above. Therefore, the cooling mist passes closer to the first layer of mesh 402 and smaller cooling liquid droplets can be collected.

FIG. 4 also show that the mesh filter 400 can include a second layer of mesh 404. In at least one implementation, the second layer of mesh 404 can be offset relative to the first layer of mesh 402. Additionally or alternatively, the second layer of mesh 404 can be rotated relative to the first layer of mesh 402. Both offsetting the second layer of mesh 404 and rotating the second layer of mesh 404 relative to the first layer of mesh 402 can decrease the size of the opening through which the cooling mist will pass and, therefore, increase the amount of cooling liquid removed from the air.

FIG. 5 illustrates an example of an air filter 500. In at least one implementation, the air filter 500 can remove one or more pollutants from the air. In particular, the air filter 500 can remove undesired particles from the air. The filtered air can be more suitable for breathing than unfiltered air.

FIG. 5 shows that the air filter 500 can include a filter material 502. In at least one implementation, the filter material 502 can include any material which will remove the desired particles from the air. For example, the filter material 502 can include fibrous material such as cotton, foam, cloth, paper, fiberglass or any other desired material. Fibrous material can increase the surface area of the filter material 502, increasing the filtering ability and decreasing the required width of the air filter 500.

FIG. 5 also shows that the air filter 500 can include one or more pleats 504. In at least one implementation, a pleat 504 (older plait) is a type of fold formed by doubling fabric back upon itself and securing it in place. I.e., a pleat 504 is a fold in the fabric where a surface is folded back to a point where it nearly touches itself. Providing one or more pleats 504 in the air filter can increase the surface area of the filter material 502, thus increasing the filtering capability of the air filter 500.

Figure 6:
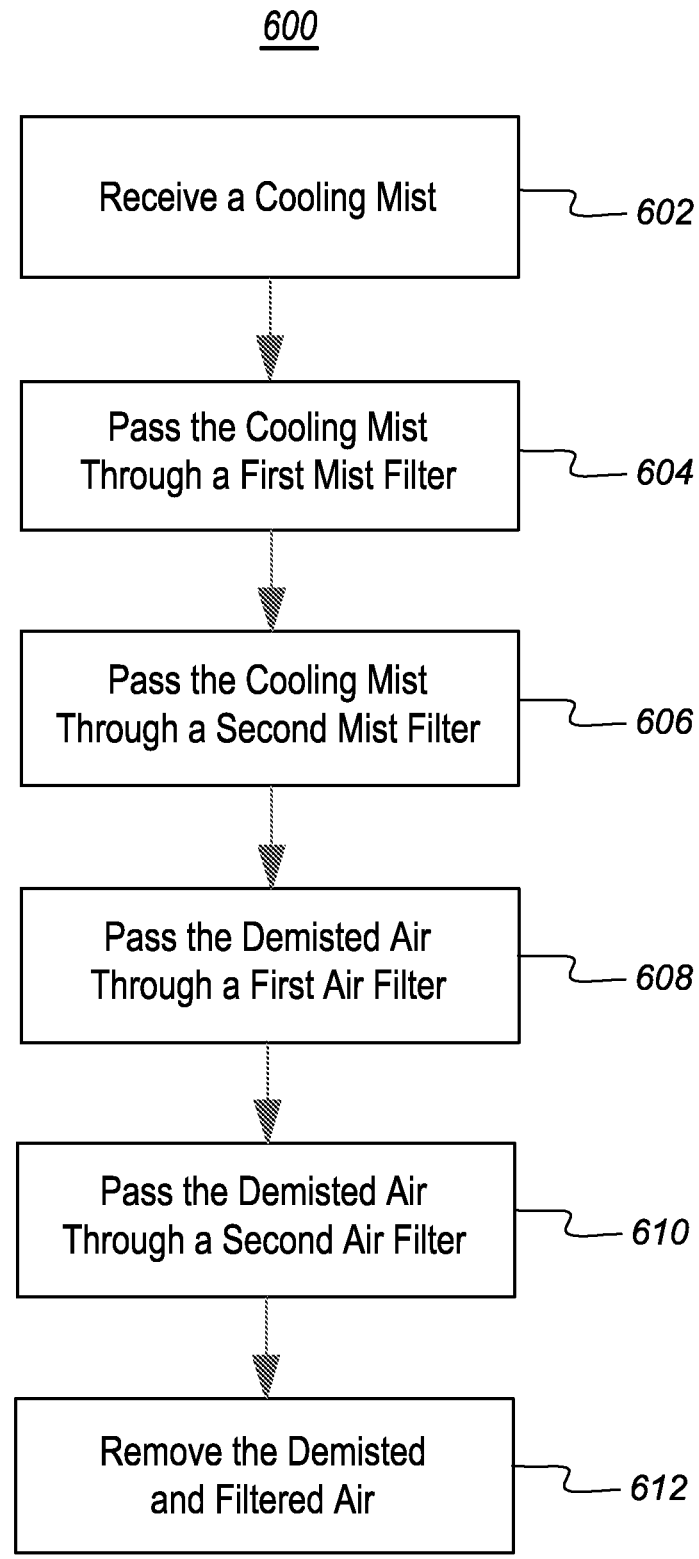
FIG. 6 is a flow chart illustrating a method of removing a cooling liquid from a mist.

FIG. 6 is a flow chart illustrating a method 600 of removing a cooling liquid from a cooling mist. In at least one implementation, the method 600 can be performed by a mist collector, such as the mist collector 100 and other components of FIGS. 1-5. Therefore, the method 600 will be described, exemplarily, with reference to the mist collector 100 and other components of FIGS. 1-5. Nevertheless, one of skill in the art can appreciate that the method 600 can be used with a mist collector other the mist collector 100 and other components of FIGS. 1-5.

FIG. 6 shows that the method 600 can include receiving 602 a cooling mist 602. In particular, many tools use a cooling liquid that is applied to either the work surface or some portion of the tool. The cooling liquid is configured to remove the heat caused by friction during the machining process. The machining process can, in turn, throw droplets of the cooling liquid into the air, creating a mist. For example, the cooling liquid can include water, antifreeze, oils, water soluble oil or any other desired cooling liquid.

In at least one implementation, receiving 602 a cooling mist can include bringing a cooling mist in through an intake 108. In at least one implementation, the intake 108 can allow cooling mist to enter the housing 102. I.e., the intake 108 can pull cooling mist into the housing, where the cooling liquid will be removed from the cooling mist. Additionally or alternatively, the collected cooling liquid can pass back through the intake 108 to be used again by the machine tool.

FIG. 6 also shows that the method 600 can include passing 604 the cooling mist through a first mist filter. In at least one implementation, the first mist filter 202 can include any desired material. For example, the first mist filter 202 can include plastic or metal. The first mist filter 202 can collect larger mist particles. I.e., the first mist filter 202 can collect large droplets from the cooling mist. For example, the first mist filter 202 can include a baffle filter. A baffle filter can include a series of baffles that the cooling mist must pass through. Because there is not a straight line through the filter, larger particles are unable to make the turns required by the air flow and collects on the baffles.

In at least one implementation, the first mist filter 202 can be inclined relative to a horizontal position. Inclining the first mist filter 202 can allow the larger droplets which have been collect to travel down the filter, where they are collected and reused as cooling liquid for the machine tool.

In at least one implementation, a fan 212 can be used to pass 604 the cooling mist through a first mist filter. I.e., the fan 212 creates an air flow that draws cooling mist into the mist collector 100 through the first mist filter 202, the second mist filter 204, the first air filter 208, the second air filter 210 and out the exhaust 110.

FIG. 6 further shows that the method 600 can include passing 606 the cooling mist through a second mist filter. In at least one implementation, the second mist filter 204 can include any desired material. For example, the second mist filter 204 can include plastic or metal. The second mist filter can collect smaller mist particles. I.e., particles which are small enough to remain in the air flow and pass through the first mist filter 202 are collected by the second mist filter 204. The second mist filter 204 can be inclined similar to the first mist filter 202, allowing the collected cooling liquid to drain. Additionally or alternatively, the second mist filter 204 can be horizontal. Any droplets collected can form drops where collected which are allowed to drip onto the first mist filter 202 then collected and returned to the machine tool.

The second mist filter 204 can include any filter configured to receive smaller mist droplets. For example, the second mist filter 204 can include a mesh filter. In at least one implementation, a mesh filter can include one or more mesh layers. Mesh consists of semi-permeable barrier made of connected strands of material. I.e., mesh includes material with very small openings. As the cooling mist passes through the mesh filter, the cooling mist collects on the strands of material. Mesh layers can be offset relative to one another, eliminating straight lines of air flow. The more mesh layers present, the more droplets collected and the less droplets allowed to pass through the mesh filter; however, more mesh layers decrease the air flow through the mesh filter increasing the required pressure to circulate the cooling mist.

FIG. 6 additionally shows that the method 600 can include passing 608 the demisted air through a first air filter. In at least one implementation, the first air filter 208 can be configured to remove one or more pollutants from the air. For example, the first air filter 208 can include a carbon filter. Carbon filtering is a method of filtering that uses a piece of activated carbon to remove contaminants and impurities, utilizing chemical adsorption. Activated carbon, also called activated charcoal, activated coal or carbo activatus, is a form of carbon that has been processed to make it extremely porous and thus to have a very large surface area available for adsorption. One pound (454 g) of activated carbon contains a surface area of approximately 100 acres. A carbon filter can be utilized to remove odors from the demisted air.

FIG. 6 also shows that the method 600 can include passing 610 the demisted air through a second air filter. In at least one implementation, second air filter 210 can remove additional air pollutants. For example, the second air filter 210 can include a particulate air filter. A particulate air filter is a device composed of fibrous materials which removes solid particulates such as dust, pollen, mold, and bacteria from the air. A particulate air filter can include foam, pleated paper, cotton, cloth or spun fiberglass filter elements. Additionally or alternatively, the second air filter 210 can include an ionizing filter. An ionizing filter, or ioniser, uses fibers or elements with a static electric charge, which attract dust particles.

One of skill in the art will appreciate that the first air filter and the second air filter can be combined with one another. For example, an ionizing filter may be able to remove both odor particles and larger particles from the air. Additionally or alternatively, the number of filters may be increased as needed to remove other pollutants or particles from the air.

FIG. 6 further shows that the method 600 can include removing 612 the demisted and filtered air. For example, the demisted and filtered air can be removed 612 through an exhaust 110. In at least one implementation, the exhaust 110 can allow clean air to exit the mist collector 100. I.e., the mist collector 100 will take in cooling mist through the intake 108, and pump out clean air, with the cooling liquid removed, through the exhaust 110. The exhaust 110 can connect to the machine tool, can be vented to the outdoors, or can be vented into the tool room, as desired by the user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for removing cooling liquid from a mist, the system comprising:
an intake, wherein the intake is configured to receive the cooling mist;
a baffle filter including a plurality of overlapping and offset layers of baffles, the baffle filter configured to collect and output cooling liquid from the cooling mist;
a mesh positioned vertically above the baffle and configured to drip cooling liquid collected thereon onto the baffle filter; and
an exhaust, wherein the exhaust is configured to output the demisted air.

2. The system of claim 1, further comprising:
an output, wherein the output is configured to remove the cooling liquid from the system.

3. The system of claim 1, wherein the cooling liquid includes one of:
water;
antifreeze;
an oil; or
a water soluble oil.

4. The system of claim 1 further comprising:
a machine tool, wherein the machine tool uses the cooling liquid to reduce frictional heat of one or more parts of the machine tool.

5. A system for removing cooling liquid from a mist, the system comprising:

a housing;

a fan, wherein the fan is configured to move air through the system;

an intake, wherein the intake is configured to allow a cooling mist from the exterior of the housing to enter the interior of the housing;

wherein the cooling mist includes cooling liquid droplets suspended in air;

a mist filter, wherein the mist filter:
  is configured to remove the cooling liquid from the mist; and includes:
    a first mist filter, wherein the first mist filter is configured to remove a portion of the cooling liquid from the cooling mist; and
    a second mist filter, wherein the second mist filter is configured to:
      remove the majority of the remaining cooling liquid from the cooling mist; and
      drip the removed cooling liquid onto the first mist filter;

an absorbent layer configured to absorb unrecoverable oil in the demisted air;

an air filter, wherein the air filter includes:
  a first air filter, wherein the first air filter is configured to remove a portion of pollutants from the demisted air; and
  a second air filter, wherein the second air filter is configured to remove a portion of the pollutants not removed by the first air filter; and an exhaust, wherein the exhaust is configured to output the demisted air.

6. The system of claim 5 further comprising a gauge, wherein the gauge is configured to indicate the state of the filters.

7. The system of claim 6, wherein the gauge includes a magnehelic gauge.

8. The system of claim 7, wherein the magnehelic gauge measures the difference between an input pressure and an output pressure.

9. The system of claim 5, wherein the first mist filter includes a metallic baffle filter.

10. The system of claim 5, wherein the second mist filter includes a metallic mesh filter.

11. The system of claim 5, wherein the first air filter includes a carbon filter.

12. The system of claim 5, wherein the second air filter includes a pleated air filter.

13. The system of claim 5, wherein the first mist filter is inclined relative to a horizontal position.

14. The system of claim 5 further comprising:
  a door, wherein the door is configured to provide access to the mist filter and the air filter.

15. The system of claim 14 further comprising an attachment, wherein the attachment connects the door to the housing with an air tight seal.

16. A method for removing cooling liquid from a cooling mist, the method comprising:
  receiving a cooling mist, wherein the cooling mist includes cooling liquid droplets suspended in air;
  passing the cooling mist through a first mist filter, wherein the first mist filter removes a portion of the cooling liquid droplets from the air;
  passing the cooling mist through a second mist filter, wherein the second mist filter removes a second portion of the cooling liquid droplets from the air to generate demisted air;
  dripping the second portion of the cooling liquid droplets onto the first mist filter;
  outputting the first and second portions of the cooling liquid droplets from the first mist filter;
  passing the demisted air through an air filter, wherein the air filter removes a portion of a desired pollutant from the demisted air; and
  outputting the demisted and filtered air.

17. The method of claim 16, wherein passing the demisted air through includes:
  passing the demisted air through a first air filter, wherein the first air filter is configured to remove a portion of pollutants from the demisted air; and
  passing the demisted air through a second air filter, wherein the second air filter is configured to remove a portion of the pollutants not removed by the first air filter.

18. The method of claim 16, wherein outputting the demisted and filtered air includes exhausting the air.

19. The method of claim 16, further comprising passing the demisted air through an absorbent layer and absorbing unrecoverable cooling liquid droplets in the demisted air prior to passing the demisted air through the air filter.

* * * * *